May 7, 1946.                  McGARVEY CLINE                  2,400,040
           MEANS FOR AND METHOD OF HANDLING CRUDE OLEO-RESINS
                    Filed Sept. 3, 1942          4 Sheets-Sheet 4

Patented May 7, 1946

UNITED STATES PATENT OFFICE

2,400,040

MEANS FOR AND METHOD OF HANDLING CRUDE OLEORESINS

McGarvey Cline, Jacksonville, Fla., assignor to Wood Process Company, Inc., Jacksonville, Fla., a corporation of Florida Continuation of application Serial No. 245,029, December 10, 1938. This application September 3, 1942, Serial No. 457,220

22 Claims. (Cl. 202—56)

This invention relates to apparatus for and methods of treating crude oleo-resins and more particularly to centralized plant equipment and methods for blending, handling, storing and processing crude oleo-resins independently of the variable, seasonal collection of oleo-resins.

The present application is a continuation of my prior co-pending application Serial No. 245,029, filed December 10, 1938.

As is well known, crude pine oleo-resin constitutes the basic raw material of the gum naval stores industry. The oleo-resin is obtained by the periodic scarification of pine trees during that portion of the year in which the processes of tree growth are active. This growth activity varies somewhat with the variable duration of the winter season, but in general the period of tree growth activity extends from the middle of March to approximately the end of November. The production of crude oleo-resin during this period of tree growth is substantially proportional to the biological activity of the tree, being small in amount in the early spring, increasing to a maximum in July and August, and then declining gradually as the end of the period of growth is approached.

In the usual method, as commonly practiced, the pine trees are scarified and as the crude oleo-resin exudes, it flows slowly down the scarified face of each tree until it is intercepted by gutters and directed by the gutters into cups from which it is collected at intervals. These intervals are approximately two weeks during the period of maximum biological activity of the trees. At the end of the season, the gum may be left in the cups without danger of overflowing. The period of collecting gum from the cups therefore may overlap the actual season of production. As this variable seasonal production of crude oleo-resin is closely related to the commercial importance of the present invention, it is here presented in detail.

A typical rate of harvesting an annual crop of crude pine oleo resin is given in the following table:

| Month | Percent of annual production |
|---|---|
| April | 5.86 |
| May | 10.97 |
| June | 12.93 |
| July | 13.57 |
| August | 12.74 |
| September | 11.08 |
| October | 9.50 |
| November | 8.48 |
| December | 8.37 |
| January | 2.74 |
| February | 1.65 |
| March | 2.11 |
| Total | 100.00 |

The crude oleo-resin is dumped from the cups into barrels holding approximately fifty gallons. These barrels are hauled from the forest, usually in wagons, to a highway where they can be loaded on an automobile truck, in which they are ordinarily transported to a still. While in the cups, the oleo resin usually becomes contaminated with chips, pine needles, sand and other forms of extraneous materials. The average gross contents of a barrel of crude oleo-resin generally weighs about 435 pounds and is generally composed of approximately the following classes of materials:

| | Pounds |
|---|---|
| Crude oleo-resin | 377 |
| Chips, bark, etc. | 22 |
| Sand and fine trash | 5 |
| Rain water | 31 |
| Total | 435 |

The aggregate contents of a barrel constitutes a viscous, tacky mass of material which for many years has defied all efforts to handle it satisfactorily as a bulk commodity. Because of the inability of the industry to deal with its basic raw material as a bulk commodity, it has heretofore been thought necessary to employ methods of processing which are based essentially on the emptying of the original barrels of crude oleo-resin directly into the processing equipment and proceeding immediately with the conversion of the crude oleo-resin into rosin and turpentine. This condition obviously makes the manufacture of gum rosin and turpentine an inseparable part of the seasonal operation of harvesting the annual crop of crude oleo-resin. This dependence of rosin and turpentine manufacture on the harvesting of the annual crop of an agricultural commodity such as crude oleo-resin has been one of the greatest economic obstacles to improving the quality of the industry's products and to modifying the grades and methods of distribution to accord with the requirements of those chemical industries which use rosin and turpentine as raw materials for the production of other commodities.

Numerous disadvantages have resulted from such former methods. A census shows that the annual crop of 2,500,000 to 3,000,000 barrels of crude oleo-resin has been harvested in conjunction with the operation of approximately 1125 independent, scattered, direct fired stills into which the crude oleo-resin was charged from the barrels in which it was brought from the forests. Such stills usually process small batches of from 8 to 10 barrels at each charge. It is due to the processing of crude oleo-resin in such small batches that such a large number of color grades of rosin, namely, fourteen, are at present commercially recognized. Many are of the opinion that the requirements of the consuming industries may be best served by not more than six grades of rosin with a sufficient quantity production of each grade to meet the requirements of each industry. The large number of grades produced makes it necessary for the larger consumers of rosin to purchase several grades and then obtain a uniform grade for their use by mixing the different grades purchased. Producers of gum rosin, especially the small producers, however, are most seriously affected by the multiplicity of grades. Such an inordinate length of time is required for the small producers to accumulate a car load of any one grade that they are forced to sell their crops in mixed grade lots. Since the smaller producers supply approximately 75% of the rosin produced, it has been necessary for the industry to operate concentration yards to which the various producers ship their mixed grade lots for sale to dealers who accumulate stocks of such lots. The transportation costs to concentration yards and the cost of handling stocks in these yards adds very materially to the cost of moving stocks from points of production to the ultimate consumer.

From the standpoint of the consumer of gum rosin, the most objectionable feature of manufacturing rosin in numerous small stills, poorly equipped and operated by unskilled labor, is the lack of uniformity of the products produced. The aforementioned and many other objectionable features are associated with the generally prevailing practice in the production and distribution of gum naval stores products.

The present invention is based on the theory that any general improvement in the industry could only be obtained by the development of practical methods and apparatus for blending relatively large quantities of crude oleo-resins in bulk, for storing the blended grades in bulk, and for transferring the blended grades from storage facilities into processing equipment associated and coordinated with the storage facilities for conversion into the desired number of predetermined standard grades of rosin and turpentine preferably for direct shipment to the consumer.

Many efforts have been made to blend and store crude pine oleo-resin prior to its conversion into rosin and turpentine. Prior to the present invention, the problem of bulk blending and storage of crude oleo-resin in the large quantities contemplated by me has been deemed by others to be one incapable of practical and economical solution. The seasonal production of oleo-resins makes it desirable that at least 30% of the annual capacity of a manufacturing plant be in storage at the end of the producing season in order to keep the manufacturing operation going until the next succeeding season's crop of oleo-resins begins to be available. Thus a centralization of manufacturing for processing 100,000 barrels of crude oleo-resin per annum would require means for storing 30,000 barrels of crude oleo-resins and means for transferring this stored material from storage to processing equipment. In attempts to handle stored crude oleo-resins, it has heretofore been found impractical to liquefy large batches of crude oleo-resin by means of heat so that it could be handled by means of pumps. The sand and fine trash contained in crude oleo-resin settle on heating coils and prevent the conduction of heat into a given charge and such settled material is difficult to remove from the liquefying equipment. Furthermore, heating results in a prohibitive loss of turpentine.

As indicated above, the commercially successful centralization of the manufacture and distribution of gum naval stores products must be based upon a practical and economical method of blending and handling crude oleo-resins and storing them in large quantities prior to processing the crude oleo-resins.

An object of the present invention is, therefore, to provide practical methods of and means for blending and storing crude oleo-resins in large quantities prior to processing it or converting it into rosin and turpentine.

A further object is to provide an arrangement of equipment in a centralized plant for receiving and processing collected crude oleo-resins particularly under conditions which permit manufacturing operations to be conducted at a uniform rate throughout the year.

Another object is to provide methods of and means for efficiently and economically handling the oleo-resins in the said centralized plant.

A preferred arrangement of apparatus in the plant for handling and processing oleo-resins in accordance with the present invention is shown in the accompanying, more or less diagrammatical drawings, forming part of this specification, and in which.

The method of operating the plant will be pointed out in connection with the following detailed description of the apparatus. Similar reference characters indicate similar parts throughout the various figures of the accompanying drawings.

Figure 1:
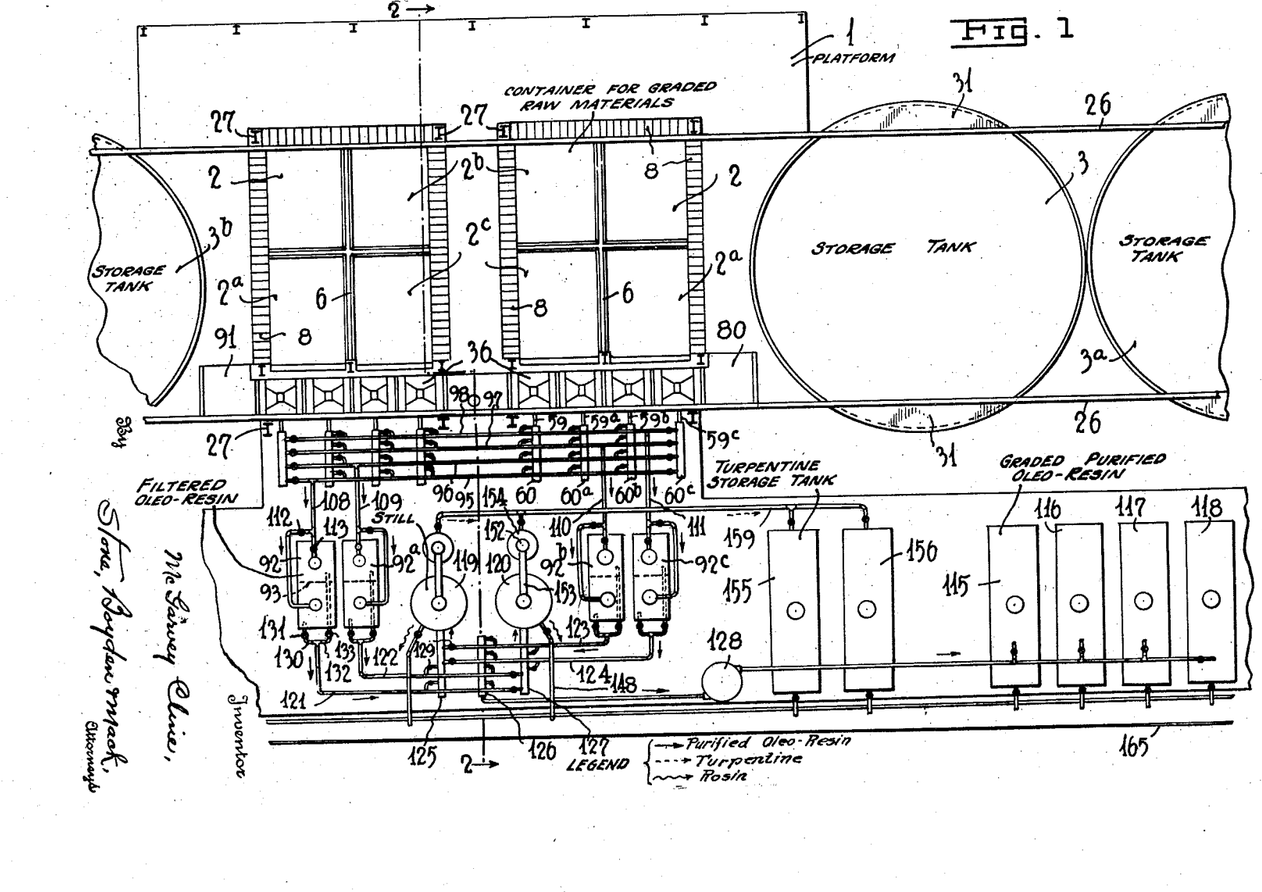
Fig. 1 is a plan view of the plant showing the relative positions of various processing and storage units in the said plant.
Figures 2, 4, 5, 6:
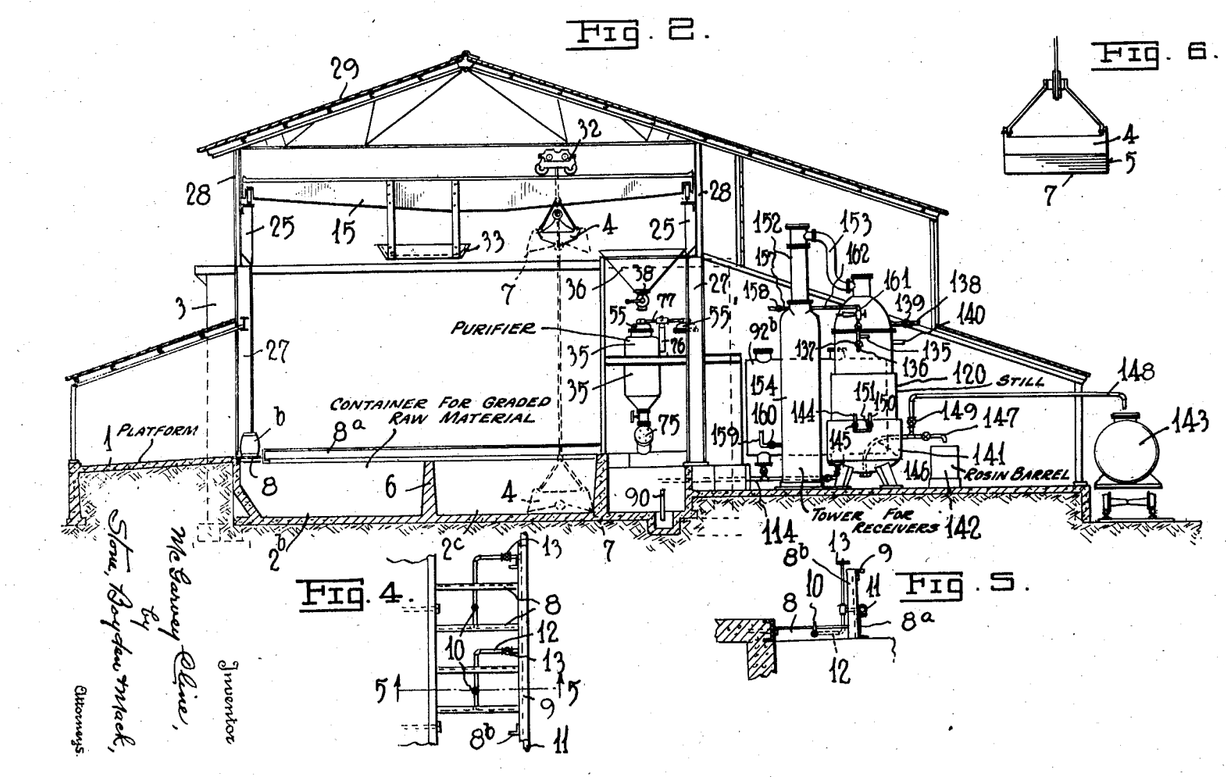
Fig. 2 is a vertical sectional view of the plant taken on line 2—2 of Fig. 1, showing by way of example a preferred form of conveying element that serves to transfer oleo-resin selectively to the various units in the plant.
Figs. 4 and 5 are detailed plan, and vertical sectional views, respectively, of means shown in Figs. 1 and 2 for emptying barrels of crude oleo-resins received at the plant.
Fig. 6 is an end view of the conveyor bucket forming part of the apparatus employed.

In proceeding in accordance with the invention, crude oleo-resin collected from the cups which are attached to trees in a forest, is accumulated in portable containers such as barrels, which are equipped with removable heads. These barrels, having an average net capacity of about 435 pounds, are transported from the forest to a highway suitable for the operation of automobile trucks and are delivered by means of the trucks to a receiving platform 1 of the plant (Figs. 1 and 2). The barrels as received are weighed and graded according to the color and general quality of their contents. In accordance with this grading, a barrel of a particular grade is emptied into a selected one of a plurality of receptacles or pits 2, 2$^a$, 2$^b$ or 2$^c$, of substantial depth, which besides serving as receiving containers for separated grades of crude oleo-resin, also serve as means in which different lots of crude oleo-resin from the barrels may be blended. The crude oleo-resin blended in the pits 2, 2ª, 2ᵇ, etc. is transferred to tanks 3, 3ª, 3ᵇ, etc., of large capacity. A separate storage tank may be provided for each grade of crude oleo-resin, thus transferred from the pits. For example, graded material in pit 2 may be conveyed to the storage tank 3, material in pit 2ª may be conveyed to the storage tank 3ª, etc.

To effect the economic centralization of the manufacture and distribution of gum naval stores products, the present invention provides an economical and practical means whereby crude oleo-resin may be blended and stored in large quantities; also a means whereby the crude oleo-resin received in the pits 2, 2ª, 2ᵇ, 2ᶜ may be readily transferred from a specific one of such pits to any selected storage tank or to a selected one of a plurality of processing units (described below) for the treatment of the particular predetermined grades of crude oleo-resin contained therein.

Owing to its extreme tackiness and viscosity, crude oleo-resin has heretofore, so far as I am aware, defied every effort to transfer or transport it, or to handle it in bulk at atmospheric temperatures. I have discovered that the problem may be effectively solved by dipping up the material by means of a dredging bucket, carried by a travelling crane. While various types of bucket may be employed, I have found that a bucket of the grab or clamshell type is preferable, especially where, as illustrated herein, the pits have a flat bottom. Other types, such as the orange-peel bucket, might tend to damage the bottoms of the pits and tanks. I have indicated a clamshell bucket at 4 in the drawings.

The successful application of the clamshell bucket is due to the fact that it utilizes to advantage the properties of crude oleo-resin, namely, its viscosity and adhesiveness, which properties have made other means impractical for handling oleo-resins. It is found that although crude oleo-resin is ordinarily of semiliquid yet flowable nature at atmospheric temperatures, its surface tension is such that it does not flow through the lips of a dredging bucket while being conveyed therein. Even when chips, pine needles, or other forms of solid trash ordinarily present in crude oleo-resin prevent the lips of the bucket from closing tightly, the crude oleo-resin does not flow through the space between the lips to any objectionable extent. As shown in Fig. 6, it is preferable to have a bucket provided with sides 5 which are normally vertical and formed with edges or lips which are straight, particularly if the pits 2, 2ª, 2ᵇ and 2ᶜ have partitions or side walls 6 which are at right angles to each other and to the flat bottoms of the pits. By such means the pits may be scraped practically clean in the process of emptying them. Likewise, owing to its peculiar nature, great difficulty has heretofore been encountered in stirring or mixing masses of crude oleo-resin, and it is practically impossible to effectively employ any known type of rotary stirrer or beater. I have discovered that the dredging bucket provides an answer to this problem, also, and that in dipping such a bucket into a pit and in scooping the crude oleo-resin therefrom, a thorough blending of the material in the pit is accomplished, also, by moving the bucket up and down in the pit, and, if desired, opening and closing it at the same time, it operates as a vertically reciprocable stirrer serving to effectively mix and blend the material. It is the usual practice to lower the bucket into the pit while in open condition, and then close it when it has gone down far enough to reach any heavier material which it is desired to scoop up.

In Fig. 2, the clamshell bucket 4 is shown in full lines in its raised, closed position and in dotted lines in its open position, and is illustrated both as elevated above one of the pits and as lowered into the pit. The outline of the bucket in the lowered position illustrates to some extent the effective manner in which the bucket 4 may be used in the pits. A lip 7 of the bucket fits squarely into the corners at the bottom of the pit and material in such corners can be readily scraped out by simply drawing the bucket into closed position.

The pits are conveniently placed near the receiving platform 1. Any number of such receiving pits may be provided but it is preferable to have at least as many as the number of grades of crude oleo-resin it is intended to store or process. The pits are also conveniently grouped with respect to each other and with respect to the receiving platform so that the workers who dump the barrels after the contents of the barrels have received a rating as to quality, do not have to move the respective barrels far to the proper pits for the particular grade of crude oleo-resin in each respective barrel.

Provision is made for supporting a barrel b in overturned position over the pits so that it may be temporarily held inverted to permit the crude oleo-resin to flow out. For this purpose, a barrel rack is provided at the edges of the pits 2. The rack, as shown enlarged in Figs. 4 and 5, comprises a plurality of spaced parallel bars 8 projecting horizontally from the floor of the platform a short distance beyond the edge of a pit. The ends of these bars 8 are supported on a channel beam 8ª, to which are also secured vertical angle posts 8ᵇ, carrying at their upper ends a guard rail 9. The guard rail is placed at such a height as to serve as a stop to prevent a barrel from being pushed into the pit. The bars 8 are close enough together to prevent a barrel from falling between them. In order to insure speedier removal of oleo-resins from a barrel, means are provided whereby the oleo-resin may be heated. Thus, between adjacent pairs of bars 8 a steam jet 10 may be placed for injecting steam upwardly into a barrel. The steam for this purpose is supplied through a header pipe 11 conveniently supported by the beam 8ª. Each of the branch pipes 12 leading to each of the jets 10 is provided with a valve 13, the handle of which is placed so that it may be readily opened and closed while barrels are being emptied.

The travelling crane, above referred to, for carrying the dredging bucket, which is conventionally illustrated in Fig. 2, is of the bridge type, and is designated in its entirety by the reference character 15. It is shown as arranged to run on tracks supported by the storage tanks 3, 3ª etc., themselves. These storage tanks, which it will be noted, are many times larger than the mixing pits, and of a diameter greater than the length of said bridge crane, are disposed in line with each other and with the pits. The number of tanks depends on the number of grades of crude pine oleo-resin to be stored. The tanks are of sufficient size to store amounts of each grade above the amount that is to be processed at any given time, in accordance with the demand and with the capacity of the processing equipment in the plan. The tops of the tanks are completely open from edge to edge, in a direction longitudinally of the line or row, and open transversely of said row for the full width between the track rails. The dredging bucket, carried by the crane, can thus travel over all parts of all of the receiving pits and across the fully open tops of all of the tanks.

The bucket, which is relatively small as compared with the pits and tanks, may serve as a mixing device in the tanks in the same way as previously described in connection with blending in the receiving pits.

Figures 7, 8, 9:
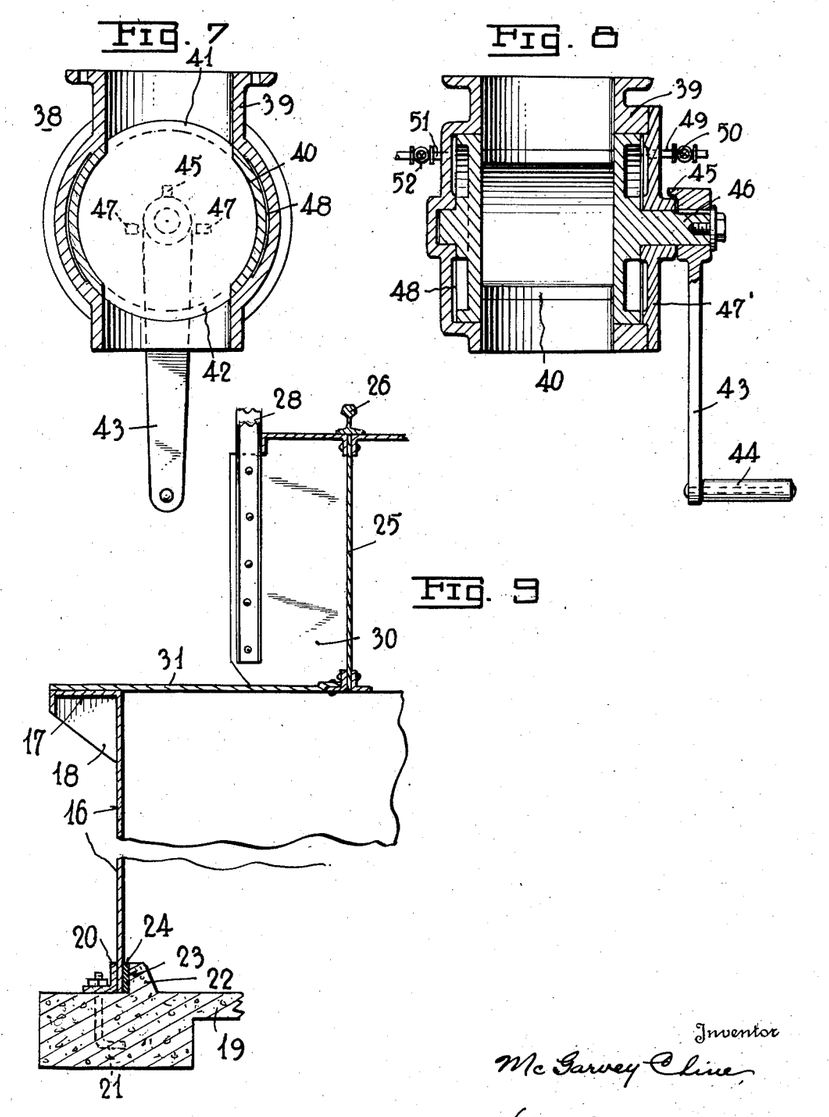
Figs. 7 and 8 are transverse and longitudinal sectional views on an enlarged scale showing a control valve hereinafter described.
Fig. 9 is a vertical section on an enlarged scale through the crane track and one of the storage tanks, parts being broken away.

The storage tanks 3, 3ª, 3ᵇ are preferably constructed with cylindrical steel shells 16 (Fig. 9). The top edge of each tank 3 is reinforced by an outwardly extending flange 17 which is rigidly supported by means of spaced bracket members 18. The bottom edge of each tank rests on a concrete base 19. The tanks are fastened to the base 19 by means of angles 20, the vertical flange of which is attached to the tank and the horizontal flange of which is anchored by means of anchor bolts 21 embedded in the concrete base 19. An annular rib or raised portion 22 of the concrete base 19 is positioned within the tank. The outer surface 23 of this raised portion 22 is vertical and cylindrical and is of a diameter somewhat less than the inner diameter of the tank, thus leaving a space between the cylindrical shoulder 23 and the inner surface of the tank in which suitable caulking material 24 is placed to prevent leakage.

Plate girder members 25 (Fig. 9) for supporting the crane rails 26 rest on the top edges of the tanks 3 and extend parallel to each other through the entire length of the plant. The portions of the girder members 25 lying over the pits 2 are supported by columns 27. The girder members 25 are designed to support a plurality of columns 28, which in turn support the roof 29. The lower end of each column 28 is riveted to a reinforcing web 30. (See Fig. 9.) The segments of the circular tops of tanks 3 which are outside of the girders 25 and are not covered by the roof structure, are closed by means of steel plates 31, securely attached to the flange 17 and to the bottom flanges of the girder element 25.

The crane 15 may be operated by electricity, and controlled by an operator in a cage (not shown) carried by the trolley 32, in the usual manner, from which the operator may, at all times, observe the functioning of the bucket 4, suspended from the trolley by a cable, by means of which it may be raised and lowered.

When the operator transfers oleo-resin material from one part of the plant to another, as for instance from a receiving pit to a storage tank, there is sometimes likely to be a collection of material which temporarily clings to the outside of the bucket. For the purpose of catching this material in case it drops off, a pan 33 is provided which is carried by the crane 15 in a position depending from the crane which does not interfere with the bucket operations, and which permits of sufficient clearance when the crane passes over the tanks 3, 3ª, 3ᵇ, etc. The bucket, after being filled, and before the crane 15 is moved, is hoisted and shifted into a position above the pan 33 where it remains during the travel of the crane. Whenever the pan 33 fills up with collected drippings, the material is removed therefrom by scooping it out with the bucket 4.

Besides serving to transfer or transport crude oleo-resin selectively from any one of the pits to any one of the storage tanks, the bucket 4 may be used to transfer the oleo-resin from any one of the pits or any one of the storage tanks selectively to any one of a plurality of processing units such as crude oleo-resin purifiers, or stills positioned preferably near the pits and beneath the path of the crane. In the process of dipping up and transferring the oleo-resin material, the bucket functions as a mixing means for blending in bulk to secure uniformity in the ultimate product for consumption.

As purifiers of crude oleo-resin, a battery of combined melting and filtering units 35 (Figs. 2 and 3) of the type shown and described in my co-pending application Serial No. 230,745, filed September 19, 1938, may be positioned adjacent the pits 2 as shown, namely, along the side opposite the platform 1, beneath hoppers 36 (Fig. 1). For convenience, although in the apparatus shown there is provision for eight units 35 as indicated by the number of hoppers 36 in Fig. 1, only four such units are shown enlarged in Fig. 3, and are numbered 35, 35ª, 35ᵇ and 35ᶜ. Thus one-half of the battery is illustrated. The other half of the equipment is symmetrical with the portion shown in Fig. 3. A separate hopper 36 is preferably provided for and above each unit 35. The hoppers 36 are positioned beneath the path of the crane 15, so that crude oleo-resin dipped up by the bucket 4 from the receiving pits or the storage tanks may be transported to and dumped into the hoppers. The hoppers 36 are each provided with a heating jacket 37, to render the crude oleo-resin more readily flowable. The bottom of each hopper is provided with a valve 38. The outlet 39 of each hopper is positioned directly above the charging mouth of a unit 35.

Details of the hopper valve 38 are shown in Figs. 7 and 8. The valve which is of a rotary type comprises a valve body 39 within which a cylindrical element 40 having openings 41 and 42 in opposite walls thereof is rotatable by means of a valve lever 43 provided with a handle 44. The cylindrical valve element 40 is shown in Fig. 7 with its openings 41 and 42 registering with the discharge opening of the hopper. The valve is open when the handle 44 of the valve lever is in its lowest position. To close the valve, the lever may be drawn up in either direction until the stop lug 45 rotatable with the valve shaft 46 reaches a stop 47 on either side of the shaft on the valve cover 47'. A space 48 between the valve 40 and the valve body 39 may be provided for the purpose of keeping the valve hot by means of steam. An inlet 49 provided with a valve 50 and an outlet 51 provided with a valve 52 serve to control the passage of steam around the valve. The steam serves effectively to keep the valve seat clean.

Figure 3:
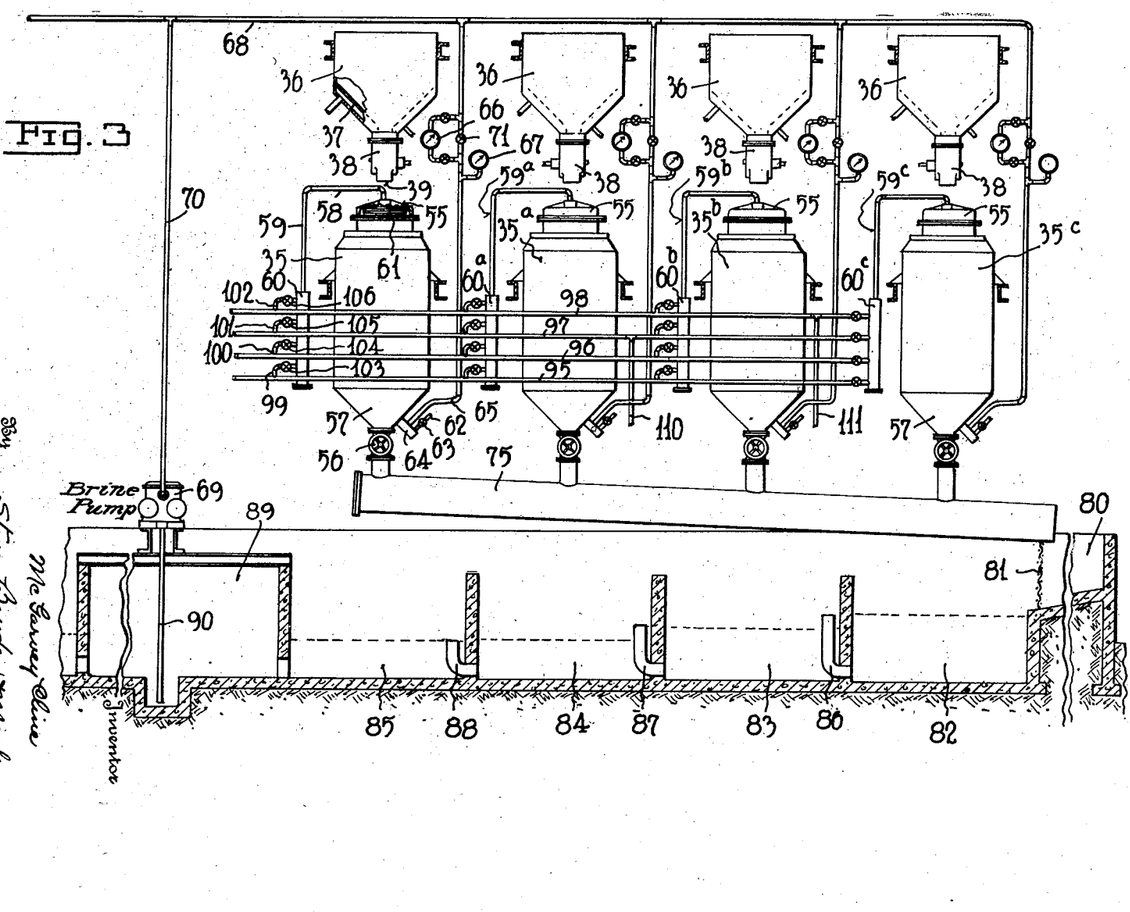
Fig. 3 is an elevational view of a battery of crude oleo-resin purifying units provided in the plant, parts being in section.

Each of the melting and filtering units 35, 35ª, 35ᵇ and 35ᶜ is similarly constructed and is provided with similar connections, so that a description of one will suffice for all. Selecting the unit 35, by way of example, this comprises a vessel having a charging mouth at the top provided with a removable cover 55. The bottom of the vessel is preferably conical and is provided with a discharge valve 56. The vessel is preferably provided with a heating jacket 57. The cover 55 has an opening therein to which a detachable pipe 58 is connected. The pipe 58 may be flexible and is connected to a pipe 59 which in turn is connected to a header 60. Beneath the cover 55 and removably attached thereto is a filter unit 61 through which liquid from the vessel must pass when discharged therefrom upwardly through the pipe 58.

When a unit 35 is to be charged, the cover 55 is removed, the valve 38 is opened, and the crude oleo-resin material is permitted to flow into the vessel 35. When the vessel is substantially full, the cover 55 is clamped on the vessel and made substantially airtight. The crude oleo-resin therein is then simultaneously melted and emulsified preferably by the injection of live steam under pressure. The steam is admitted into the vessel 35 through a pipe 62 provided with a valve 63, which pipe is connected to an injector 64. After the charge of crude oleo-resin containing all the extraneous trash ordinarily associated with it has been completely melted and emulsified, it is displaced upwardly through the filter 61 in the cover 55 and into the header 60. For this purpose, high gravity brine upon which liquid oleo-resin floats is passed into the bottom of the vessel 35 through a pipe 65 connected to the injector 64. The brine inlet pipe 65 is provided with a flow meter or volumetric gauge 66 and a pressure meter 67 and is connected to a manifold 68 which in turn is connected to a brine circulating pump 69 by means of a pipe 70. For controlling the rate of introducing the brine into the vessel 35 and hence the pressure on the filter 61, the pipe 65 is provided with a valve 71.

Knowing the capacity of the vessel 35, and the volume of a given charge, an operator can determine approximately how much brine it is necessary to introduce into the vessel 35 in order to discharge the oleo-resin substantially completely. The brine feed is cut off when the brine oleo-resin interface reaches a level preferably in the vicinity of the outlet pipe 58. If desired, suitable sampling cocks, sight glasses, or lock boxes may be conveniently placed for observing the condition of the discharge. When the discharge is completed, the valve 71 in the brine pipe 65 is closed and the valve 56 is opened. The cover 55 is raised slightly from the mouth of the vessel 35, whereupon the brine rushes out through the valve 56 into the conduit 75, carrying with it the trash or solid and unfiltered material. While discharging the brine, steam or brine may be injected through the injector 64 to agitate the contents of the unit 35 and thereby prevent the outlet from clogging.

After the brine and the trash have been removed from the vessel 35, the valve 56 is closed and the vessel 35 is recharged with crude oleo-resin. As stated above, a removable filter element 61 is provided in the cover 55. In Fig. 2, means are shown whereby the cover 55 may be replaced by a duplicate cover 55' likewise containing a filter element. While the cover 55' is in use, the filter element in the cover 55 may be cleaned or replaced by a fresh filter element. One type of means for conveniently replacing the covers comprises a post 76 on the upper end of which a lever element 77 is mounted in pivotal position. The covers 55 and 55' are balanced on opposite ends of the lever element 77. By this means either cover 55 or 55' may be readily swung into position for clamping on the mouth of the vessel 35.

The brine and trash from the melting and filtering units 35, 35$^a$, 35$^b$ and 35$^c$ flows through the conduit 75 into a trash bin 80. The outlet of the trash bin 80 is provided with a screen 81 which retains the solid trash but permits the brine and small amounts of oleo-resin material emulsified with it to flow through a series of interconnecting pools having progressively lower levels in compartments 82, 83, 84, 85 arranged under the melting and filtering units. The brine mixture flows slowly from one compartment to the other successively through restricted outlets 86, 87, 88. Each of the latter outlets comprises a pipe extending from the bottom of one compartment upwardly into the next compartment and terminating in an open end, each positioned at a predetermined level. The level of each pipe 86, 87 and 88 is successively lower when proceeding from right to left. The brine eventually flows into a central supply tank 89 in which it is available for recirculation by the pump 69 and is withdrawn thereby through an intake pipe 90. The brine tanks to the left of the central supply tank 89 feed brine into the tank 89 in the same manner as those to the right.

During the slow, broken flow of the brine mixture from the trash bin 80 to the tank 89, the brine cools and any oleo-resinous material previously mixed with it rises to the surface and is periodically removed therefrom while in the compartments 82, 83, 84 and 85 before the brine reaches the tank 89. The oleo-resinous material removed from the brine compartments is used for the production of low grades of rosin.

The trash bin 80 at one end of the battery of melting and filtering units and the trash bin 91 (Fig. 1) at the other end of the battery, are positioned under the crane 15 so that the dredging bucket 4 may be used for removing the trash.

The various grades of oleo-resin treated in the melting and filtering units may be separately stored in storage chambers 92, 92$^a$, 92$^b$ and 92$^c$. These chambers may, if desired, be divided into compartments for further separation of different grades. The chambers shown are each divided by a partition 93. Thus in the plant shown, as many storage chambers for purified oleo-resin are provided as there are receiving pits, in the event that each pit is to be used for a separate predetermined grade or blend to be processed for the production of a corresponding grade of purified oleo-resin.

The oleo-resin from the melting and filtering units is referred to herein as purified or refined in the sense that it is cleaned of at least the suspended solid matter comprising principally the trash usually found in crude oleo-resin, and the water-soluble acid content thereof is reduced.

Any number of the melting and filtering units in the battery may be used for simultaneously treating a single grade or blend of crude oleo-resin and the purified oleo-resin produced may be directed from each unit to any one or more of the storage chambers 92, 92$^a$, 92$^b$, 92$^c$. Furthermore, a plurality of grades or blends may be separately treated simultaneously in the battery and the purified oleo-resin produced from each grade may be directed from each unit simultaneously or successively to the storage chambers 92, 92$^a$, 92$^b$, 92$^c$ selectively, for storing each grade separately. The storage chambers are each of a capacity preferably at least equal to the volume of oleo-resin obtained from the entire battery of units 35.

For the purpose of distributing the purified oleo-resin selectively from any one of the melting and filtering units 35 in the battery to the storage chambers, a bank of pipes is provided, as shown in Figs. 1 and 3. The discharge pipes 59, 59$^a$, 59$^b$ and 59$^c$ from the melting and filtering units 35, 35$^a$, 35$^b$ and 35$^c$ respectively are connected to the headers 60, 60$^a$, 60$^b$ and 60$^c$ respectively. Each of the four pipes 95, 96, 97 and 98 in the bank is connected to each of the headers by connecting pipes each provided with a valve.

For instance, the header 60 is connected to the pipes 95, 96, 97 and 98 by connecting pipes 99, 100, 101 and 102, each provided with a valve 103, 104, 105 and 106 respectively. The other headers 60ᵃ, 60ᵇ and 60ᶜ are each connected to the pipes 95, 96, 97 and 98 in substantially similar fashion. The pipes 95, 96, 97 and 98 are respectively connected to the pipes 108, 109, 110 and 111, shown in plan view in Fig. 1 for purposes if illustration. Pipes 108, 109, 110 and 111 are provided with branch pipes properly fitted with valves, the branch pipes serving to connect the pipes 108, 109, 110 and 111 respectively with the compartments in the storage chambers 92, 92ᵃ, 92ᵇ and 92ᶜ. The pipes 59, 59ᵃ, 59ᵇ and 59ᶜ are shown in Fig. 1 coming from underneath the hoppers 36 and from the filtering units to which they are connected.

The operation of the distribution system for purified oleo-resin will be clear from the following example. If, for instance, oleo-resin is to be conducted from the melting and filtering unit 35 to a compartment in the storage chamber 92, the valve 103 in the connection 99 is opened whereupon the oleo-resin flows from the header 60 into the pipe 95 and then into the pipe 108 from which it may be conducted into a compartment in the tank 92 by opening either valve 112 or 113 in the branch pipes connected to the pipe 108. It can be readily understood from this how oleo-resin from any one of the melting and filtering units can be conducted to any one of the compartments in the storage chambers.

The oleo-resin collected in the storage chambers 92, 92ᵃ, 92ᵇ and 92ᶜ frequently contains some of the brine employed as displacing liquid in the melting and filtering units. This brine collects at the bottom of each of the storage chambers and may be conducted to the brine tanks by means of a pipe 114.

The purified oleo-resin may be distributed to consumers as such or it may be further processed, as for instance by distillation to obtain turpentine and rosin. Tanks 115, 116, 117 and 118 are provided for the purpose of providing additional storage space for the collected purified oleo-resin, each tank to be used for a different grade or a blend of various grades. Stills 119 and 120 are used for converting the oleo-resin into rosin and turpentine.

A separate distribution system is provided whereby oleo-resin may be selectively conducted from any one of the compartments in the storage chambers 92, 92ᵃ, 92ᵇ and 92ᶜ to either one of the stills 119, 120 or to any one of the storage tanks 115, 116, 117, 118. This distribution system is shown in plan view in Fig. 1. Pipes 121, 122, 123 and 124 connected respectively to storage chambers 92, 92ᵃ, 92ᵇ and 92ᶜ are each connected to headers 125, 126 and 127. The headers 125 and 127 are connected respectively to the stills 119, 120. The header 126 is connected to a pump 128, which in turn is connected to the storage tanks 115, 116, 117 and 118. The connections between the pipes 121, 122, 123 and 124 and the headers 125, 126 and 127 are each provided with a valve 129. Branch pipes connected to the pipes 121, 122, 123 and 124 extend into the separate compartments of the storage chambers 92, 92ᵃ, 92ᵇ and 92ᶜ respectively. In the storage chamber 92, for instance, a branch pipe 130 provided with a valve 131 connects one compartment of the storage chambers 92 and a branch pipe 132 provided with a valve 133 connects the other compartment of the storage chamber 92 to the pipe 121. To conduct oleo-resin, for instance, from a compartment in the storage chamber 92 to a still 119, the valve 131 or 132 is opened to permit the flow of oleo-resin into the pipe 121 and thence into the header 125. To conduct the oleo-resin to one of the storage tanks 115, 116, 117, 118, the oleo-resin is conducted into the header 126 and thence through the pump 128. Thus it is seen that not only may the separate grades of purified oleo-resin be separately stored but each grade may be separately distilled or several grades of oleo-resin may be blended either for storage or for distillation. Furthermore it is thus possible to provide any desired predetermined grades of purified oleo-resin as well as rosin.

The stills 119 and 120 are similar to each other and therefore the following description of the still 120, shown in Fig. 2, applies also to the still 119. The stills may be provided with means for operating in batch or continuously. The still 120 is of the batch type having a closed heating coil supplied with steam through a pipe 135 connected to a pipe 136 having a valve 137. Besides heating the still with the closed coil, an open coil or sparger may also be used for introducing high pressure steam directly into a charge. A pipe 138 provided with a valve 139 may be connected to such an open coil or sparger. A pipe 140 connected to the header 127 (Fig. 1) serves for the introduction of a charge of oleo-resin.

Directly beneath the still 120 is a receiver 141. Suitable connections are provided between the still and the receiver for permitting the discharge of residue (rosin) left in the still into the receiver by gravity. This residue or rosin is withdrawn from the receiver while molten and passed directly into a rosin barrel 142 or into a tank car 143. The rosin may be removed from the receiver 141 by means of compressed air introduced through a pipe 144 provided with a valve 145. Pressure is exerted on the level of the rosin in the receiver and the rosin is forced out through an open ended pipe 146. This pipe is connected to a tap 147 and to a pipe 148 provided with a valve 149. The tap 147 serves to fill the barrel 142 and the pipe 148 serves to fill the tank car 143.

When the receiver 141 is empty, additional rosin is run in from the still and to facilitate this, air in the receiver is displaced through a pipe 150 provided with a valve 151.

The top of the still 120 is connected to a condenser 152 by means of a pipe 153. Receivers are positioned in a tower 154 beneath the condenser 152 for the collection of turpentine. For the purpose of delivering the turpentine either continuously or intermittently from the receivers in the tower 154 to storage tanks 155 and 156, compressed air may be introduced through a pipe 157 provided with a valve 158 which forces the turpentine through a pipe 159, provided with a valve 160. The pipe 159 is connected to the storage tanks 155 and 156.

For the purpose of charging the still 120, suction may be applied to the receivers in the tower 154. This is accomplished by means of a steam jet exhauster 161 capable of providing a 28 inch vacuum. The suction inlet of the exhauster is connected to the turpentine receivers by means of a pipe 162. When the steam jet exhauster 161 is in operation, the reduced pressure in the condenser 152 and the still 120 causes the oleo-resin in a storage chamber 92, 92ᵃ, 92ᵇ or 92ᶜ to be sucked into the still through the header 127. The steam jet exhauster 161 may be used to provide a vacuum during distillation as well as for charging the still. The storage chambers 92, 92ª, 92ᵇ, 92ᶜ may be equipped with heating coils (not shown) for the purpose of increasing the fluidity of the oleo-resin.

Tank cars spotted on the track 165 may be conveniently loaded with turpentine from the storage tanks 155 and 156 or with oleo-resin from the storage tanks 115, 116, 117, 118.

The stills described above, employing vacuum steam distillation, may, for example, have a capacity of distilling about 2000 gallons of crude oleo-resin into rosin and turpentine in three hours, as contrasted to direct fire stills heretofore commonly used which convert about 450 gallons of crude oleo-resin into rosin and turpentine in the sametime. The vacuum steam distillation of the oleo-resin in the present invention has been found highly successful because of its coordination with the blending, storing, and purifying operations prior to distillation. The stills and method of distillation may therefore be considered a part of the whole coordinated plant which permits the centralization of the major manufacturing operations of the gum naval stores industry.

The invention described and claimed herein has in its application to the gum naval stores industry certain outstanding advantages. The manufacturing operations are rendered entirely independent of the variable seasonal harvesting of the annual crop of crude oleo-resins. This complete independence permits the manufacturing operations to proceed at controlled rates of production throughout the year. It permits the continuous and efficient use of processing equipment throughout the year, thus greatly lessening the amount of capital invested in such equipment. Due to inefficient seasonal operation, the processing equipment heretofore required by the industry has been approximately three times that which would be necessary if manufacturing operations were conducted at efficient operating rates throughout the year. The seasonal production of manufactured inventories of rosin and turpentine and the accumulation of such inventories in concentration yards are eliminated and substituted by direct shipment to consumers as the manufactured commodities are produced. A direct manufacturing control is permitted over the number of grades of rosin produced and the quantity of each grade produced as well as over the type of containers and methods of shipping. The number of grades of rosin produced may be regulated in accordance with the requirements of the consuming industries. The production of rosins and turpentine superior in cleanness and uniformity of physical and chemical properties is insured. By providing practical means for the handling, bulk blending and storage of crude oleo-resin, this agricultural product is made a fungible basic commodity which may be directly converted into rosin and turpentine or other products, in manufacturing operations which can be conducted throughout the year and entirely dissociated from the seasonal harvesting of the annual crops of crude oleo-resin.

What I claim is:

1. The method of handling a viscous, tacky, resinous liquid which comprises dipping up portions of it from bulk in a dredging bucket, and transporting such dipped up portions in said bucket to any desired location.

2. In the handling of crude oleo-resins in a plant having a fixed receptacle of substantial depth, the steps which comprise depositing successive increments of crude oleo-resins in said receptacle until it is at least partially filled with a mass of material, then scooping up batches of the accumulated material in a dredging bucket from a point near the bottom of the receptacle, and lifting them up through the mass to the top.

3. In the handling and treating of crude oleo-resins for the production of naval stores, the method which comprises collecting the crude oleo-resins in portable containers, transporting such containers to a central point, dumping such containers into a relatively large stationary receptacle of substantial depth, and thoroughly mixing and blending the material in said receptacle by dipping up portions thereof from near the bottom and lifting such portions vertically through the mass toward the top.

4. In the handling and processing of crude oleo-resins for the production of naval stores, the method of handling and blending a mass of crude oleo-resins contained in an open top receptacle of substantial depth which comprises lowering a dredging bucket in open condition into such mass to a point well below the surface thereof, then closing the bucket and raising it up through the mass.

5. In the handling of crude oleo-resins in a plant having a fixed receptacle of substantial depth, the method which comprises depositing successive increments of crude oleo-resins in said receptacle until it is at least partially filled, and then mixing and blending the material in said receptacle by submerging therein a dredging bucket and moving such bucket up and down through the material.

6. In the handling and processing of crude oleo-resins in a plant having a receiving pit, the method which comprises dumping a plurality of portable containers of oleo-resins into said pit, and then mixing and blending the material in the pit by submerging in the material a dredging bucket and moving such bucket up and down in the material.

7. In the handling and processing of crude oleo-resins in a plant having a receiving pit, the method which comprises dumping a plurality of portable containers of oleo-resins into said pit, and then mixing and blending the material in the pit by submerging in the material a dredging bucket and moving such bucket up and down in the material while at the same time opening and closing the same.

8. In the handling and processing of crude oleo-resins, the steps which comprise collecting the crude oleo-resins in portable containers, dumping said containers into a relatively large, fixed, open receptacle of substantial depth, mixing and blending the crude oleo-resins at atmospheric temperature by moving a dredging bucket up and down through the mass of material in said receptacle, and transferring successive batches of such blended crude material to other apparatus.

9. In the handling and processing of crude oleo-resins, the steps which comprise collecting the crude oleo-resins in portable containers, dumping said containers into a relatively large, fixed, open receptacle of substantial depth, mixing and blending the crude oleo-resins at atmospheric temperature by moving a dredging bucket up and down through the mass of material in said receptacle, and dipping up successive batches of such blended crude material in said bucket and thus transporting them to other apparatus.

10. In the handling of crude oleo-resins in a plant having a storage tank of substantial depth, the steps which comprise delivering successive batches of crude oleo-resins into said tank until it is at least partially filled, mixing and blending the accumulated material in said tank by moving a dredging bucket up and down through the same, and then transferring successive batches of such mixed and blended material to other apparatus.

11. In the blending of crude oleo-resins in a plant having a storage tank of substantial depth, the steps which comprise delivering successive batches of crude oleo-resins into said tank until it is at least partially filled, mixing and blending the accumulated material in said tank by moving a dredging bucket up and down through the same, and then dipping up successive batches of such mixed and blended material in said bucket, and transporting them to other apparatus.

12. In the handling and processing of crude oleo-resins in a plant having a processing unit and a mixing and storing tank of substantial depth, capable of storing an amount of material greater than that to be processed at any given time, the steps which comprise delivering successive batches of crude oleo-resins into said tank, stirring, at atmospheric temperature, the material in said tank throughout the depth thereof by moving a dredging bucket up and down therein, until it is thoroughly mixed and blended, and dipping up in said bucket and transferring successive batches of such mixed and blended material, as desired, to said processing unit.

13. In the handling of crude oleo-resins in a plant having a fixed receptacle of substantial depth, the steps which comprise depositing successive increments of crude oleo-resins in said receptacle until it is at least partially filled with a mass of material, then thoroughly mixing and blending the accumulated material at atmospheric temperature by moving a dredging bucket up and down through the same, and dipping up in said bucket and transferring successive batches of such mixed and blended material to other apparatus.

14. In a method of handling and processing crude oleo-resin, the steps which comprise transporting a plurality of portable containers loaded with material from widely separated production areas to a central point, and dumping the crude material into a relatively large fixed receptacle, mechanically stirring said crude oleo-resin in said receptacle to thoroughly mix and blend the same, and thereafter mechanically dipping up batches of the accumulated blended mixture of crude material from said receptacle and carrying the same to processing equipment.

15. In the storing and processing of crude oleo-resins in a plant having an open top receiving pit and open top storage tank, the steps which comprise collecting said crude oleo-resins in portable containers, dumping said containers into said pit, transporting said oleo-resins from said pit to said tank by dipping up a batch of material in a dredging bucket of the clam shell type, moving such bucket to a position over the tank, and dumping same.

16. In a method of operating a plant for processing crude oleo-resins, the steps comprising grading crude oleo-resins received in the plant, placing each grade or range of grades of crude oleo-resins into a separate one of a plurality of fixed receptacles, stirring and blending by means of a clam shell bucket the thus separated masses of crude material at atmospheric temperature in the said receptacles to provide predetermined grades of blended crude material, transferring by means of said bucket each of the resulting crude blends of substantially uniform composition to separate relatively large storage tanks, and supplying processing equipment from said tanks, whereby such equipment may be continuously operated over extended periods independently of the variable seasonal collection of crude oleo-resins.

17. In a method of operating a plant for processing crude oleo-resins, the steps comprising dumping the crude oleo-resin received in relatively small batches at the plant during the harvesting season into a mixing pit capable of holding many such batches, thoroughly blending the mass of material in the pit to provide oleo-resin material of substantially uniform physical and chemical properties, then dipping up the blended material from the pit by means of a clam shell bucket and transporting it to a storage tank many times larger than said pit, and finally supplying the blended material at atmospheric temperature from said storage tank to processing equipment, whereby such equipment may be operated at a uniform rate, over long periods of time, independently of the variable seasonal collection of crude oleo-resins.

18. In a plant for handling crude oleo-resins, the combination with a suitable fixed, open top receptacle for oleo-resin, of a travelling crane and dredging bucket carried thereby, movable over said receptacle, for dipping up crude oleo-resin therefrom and transporting it to other points, a drip pan carried by said crane for catching the drippings from said bucket, means for moving said bucket to a position over said pan when desired, and means whereby said bucket may be manipulated to scoop up and remove the accumulated drippings from said pan.

19. In a plant for handling crude oleo-resins, the combination with a suitable fixed, open top receptacle for oleo-resin, of a travelling crane and dredging bucket carried thereby, movable over said receptacle for dipping up crude oleo-resin therefrom and transporting it to other points, a drip pan carried by said crane for catching drippings from said bucket, and means for positioning said bucket over said pan during the travel of said crane.

20. Apparatus for the handling and processing of crude oleo-resins comprising a plurality of portable containers, a fixed receptacle so positioned that said containers may be dumped into it and having a capacity many times that of said containers, a storage tank having a capacity many times that of said receptacle, purifying and distillation equipment, and means including a clam shell bucket for transferring material from said receptacle to said tank, for mixing and blending the material in said tank, and for transferring blended material from said tank to said purifying and distillation equipment.

21. A plant for processing crude oleo-resins collected from trees, comprising bulk-blending, storage, processing and distribution equipment in a centralized unit including a platform for receiving portable containers of crude oleo-resins, pits for receiving oleo-resins from said containers, storage tanks for storing crude oleo-resins in bulk, processing apparatus for purifying the crude oleoresins and for converting them into rosin and turpentine, and means including a dredging bucket for mixing and blending the crude oleo-resins in said tanks and for transferring batches of the blended crude oleo-resins at atmospheric temperature from said tanks to said processing apparatus, whereby the processing of crude oleo-resins is carried on independently of the variable, seasonal collection of oleo-resins from the trees.

22. A plant for processing crude oleo-resins collected from trees, comprising bulk-blending, storage, processing and distribution equipment in a centralized unit including a platform for receiving portable containers of crude oleo-resins, pits for receiving graded oleo-resin from the said containers, means for mixing and blending the accumulated material in said pits, storage tanks for storing blended and graded crude oleo-resin in bulk, a battery of washing and filtering units for clarifying and purifying crude oleo-resins, distilling means for converting the purified oleo-resins into rosin and turpentine, and means for selectively transferring crude oleo-resins at atmospheric temperature from said pits to the individual washing and filtering units or to the storage tanks for blended and graded crude oleo-resins, whereby the processing of crude oleo-resins is conducted independently of the variable, seasonal collection of oleo-resins from trees.

McGARVEY CLINE.